US007097398B2

(12) United States Patent
Hernandez, Jr.

(10) Patent No.: US 7,097,398 B2
(45) Date of Patent: Aug. 29, 2006

(54) MULTI-FUNCTIONAL BIT & CONNECT-DISCONNECT COUPLING USED THEREWITH

(75) Inventor: Hector Ray Hernandez, Jr., Fullerton, CA (US)

(73) Assignee: Alltrade Tools LLC, Long Beach, CA (US)

( * ) Notice: Subject to any disclaimer, the term of this patent is extended or adjusted under 35 U.S.C. 154(b) by 0 days.

(21) Appl. No.: 10/714,329

(22) Filed: Nov. 14, 2003

(65) Prior Publication Data

US 2005/0105983 A1    May 19, 2005

(51) Int. Cl.
*B23B 51/02* (2006.01)

(52) U.S. Cl. ............... 408/224; 408/226; 408/238; 279/14; 279/158; 279/165

(58) Field of Classification Search ............ 279/7, 279/14, 75, 158, 165; 408/223, 224, 225, 408/226, 231, 238, 239 R, 240, 713
See application file for complete search history.

(56) References Cited

U.S. PATENT DOCUMENTS

| 339,544 | A | * | 4/1886 | Graham | 408/226 |
|---|---|---|---|---|---|
| 2,429,375 | A | * | 10/1947 | Smith | 279/102 |
| 4,895,482 | A | * | 1/1990 | Aurentz | 408/225 |
| 4,917,550 | A | * | 4/1990 | Aurentz | 408/225 |
| 5,078,555 | A | * | 1/1992 | Aurentz | 408/231 |
| 5,651,647 | A | * | 7/1997 | Ray | 408/239 R |
| 5,700,113 | A | * | 12/1997 | Stone et al. | 408/1 R |
| 5,927,912 | A | * | 7/1999 | Mihai et al. | 408/226 |
| 5,938,212 | A | * | 8/1999 | Wadsworth | 279/42 |
| 5,975,815 | A | * | 11/1999 | Zierpka et al. | 408/226 |
| 6,030,157 | A | * | 2/2000 | Erpenbeck | 408/226 |
| 6,200,076 | B1 | * | 3/2001 | Fujii et al. | 408/226 |
| 6,241,434 | B1 | * | 6/2001 | Ajimi | 408/238 |
| 6,325,393 | B1 | | 12/2001 | Chen et al. | 279/22 |
| 6,347,914 | B1 | * | 2/2002 | Boyle et al. | 408/240 |
| 6,394,715 | B1 | * | 5/2002 | Boyle et al. | 408/238 |
| 6,511,268 | B1 | * | 1/2003 | Vasudeva et al. | 408/239 R |
| 6,874,791 | B1 | * | 4/2005 | Chen et al. | 279/75 |
| 2002/0159850 | A1 | * | 10/2002 | Ravid | 408/226 |
| 2004/0232631 | A1 | * | 11/2004 | Chen et al. | 279/75 |
| 2005/0031424 | A1 | * | 2/2005 | Hernandez et al. | 408/238 |

* cited by examiner

*Primary Examiner*—Monica Carter
*Assistant Examiner*—Michael W. Talbot
(74) *Attorney, Agent, or Firm*—John J. Connors; Connors & Assoc. Inc.

(57) ABSTRACT

A tool employs a connect-disconnect coupling for a power drill to hold a multi-functional bit having at its one end a drill element adapted to form a hole and a countersink and at its other end a driver element to drive a screw or other type of fastener.

25 Claims, 11 Drawing Sheets

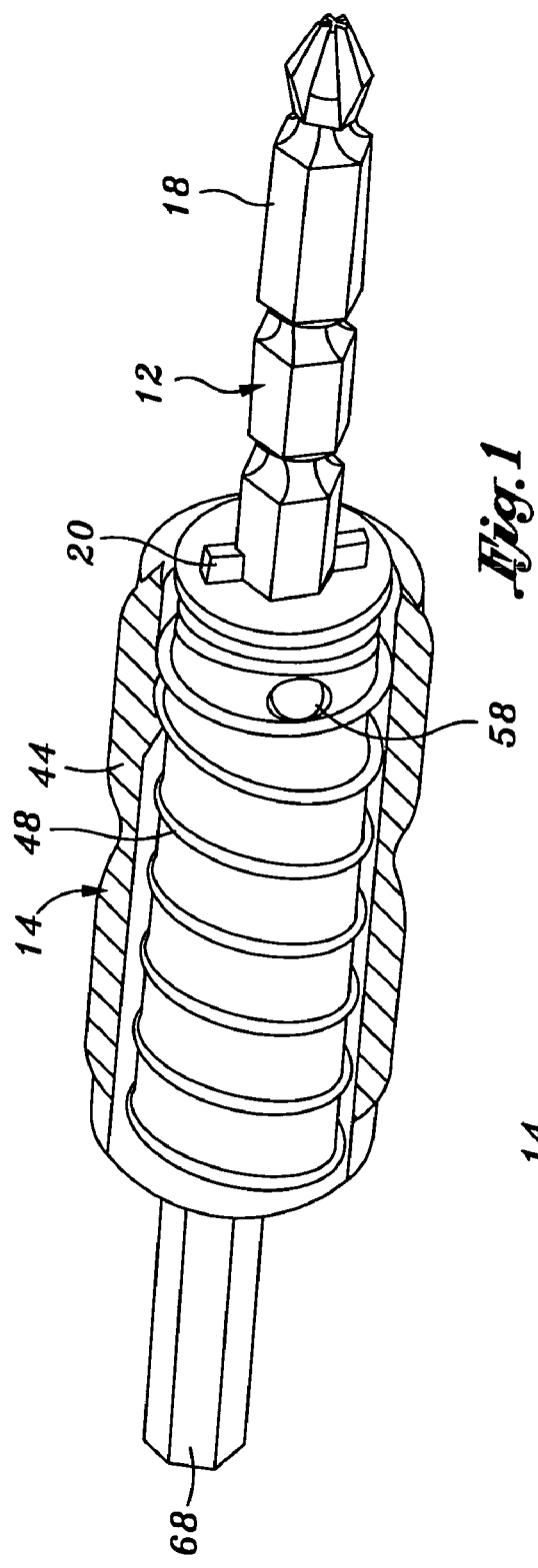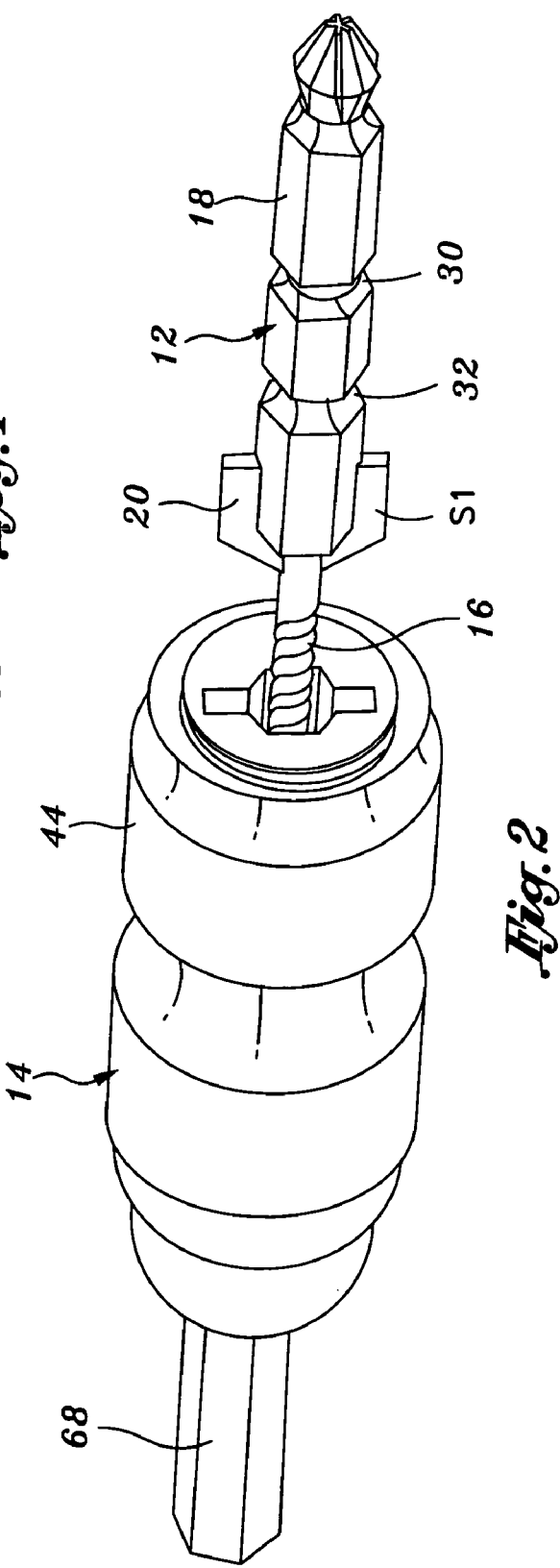

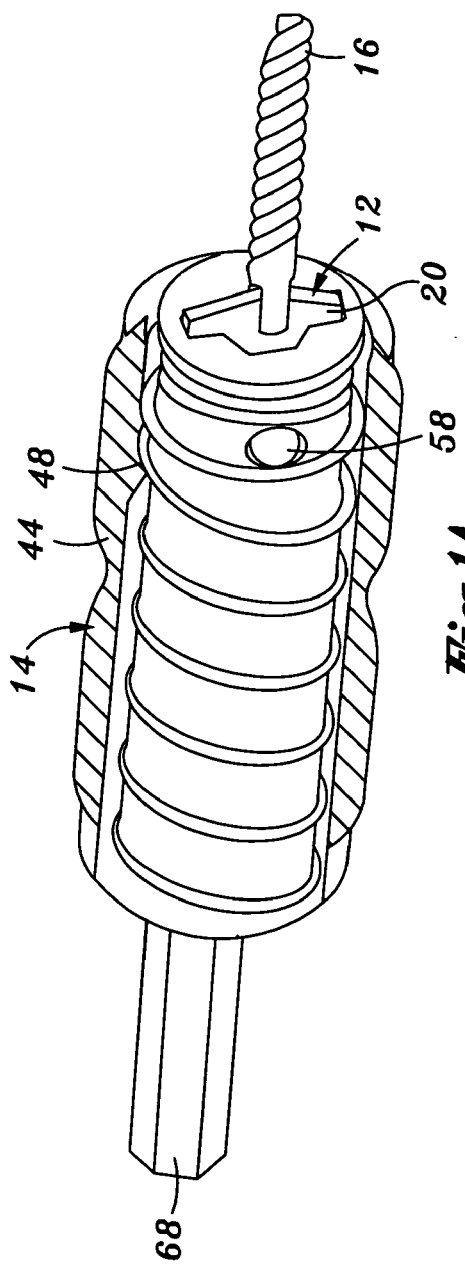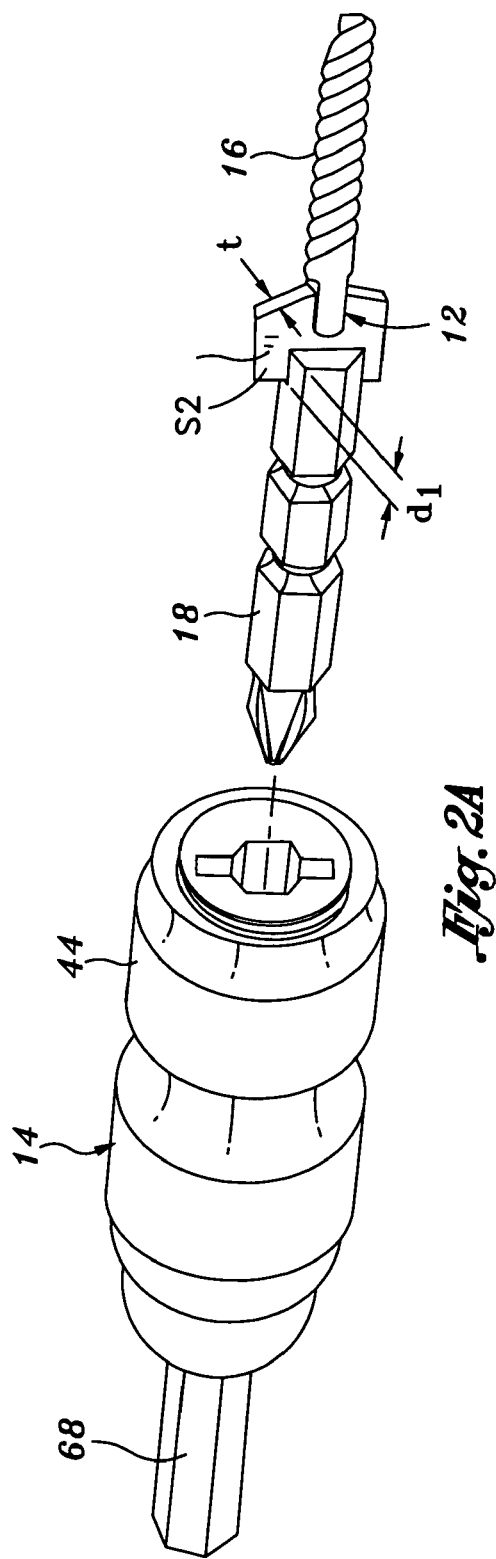

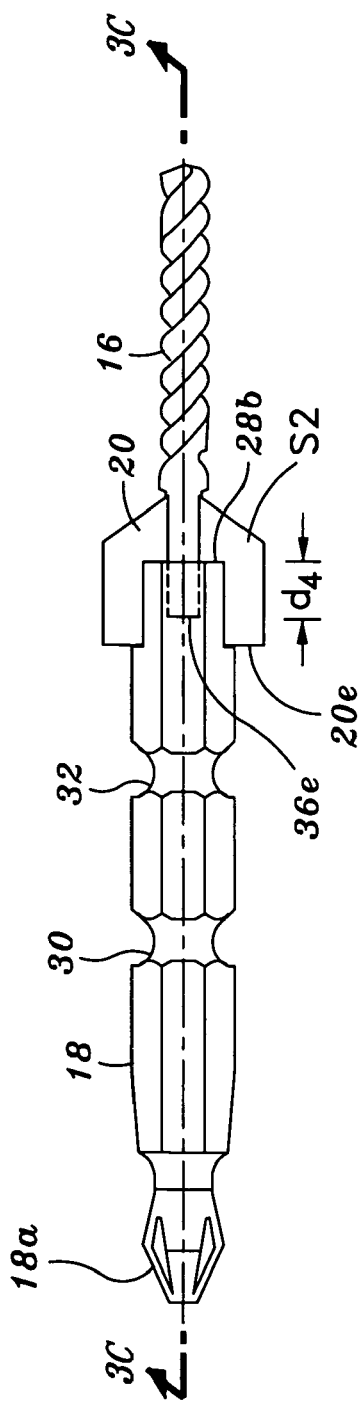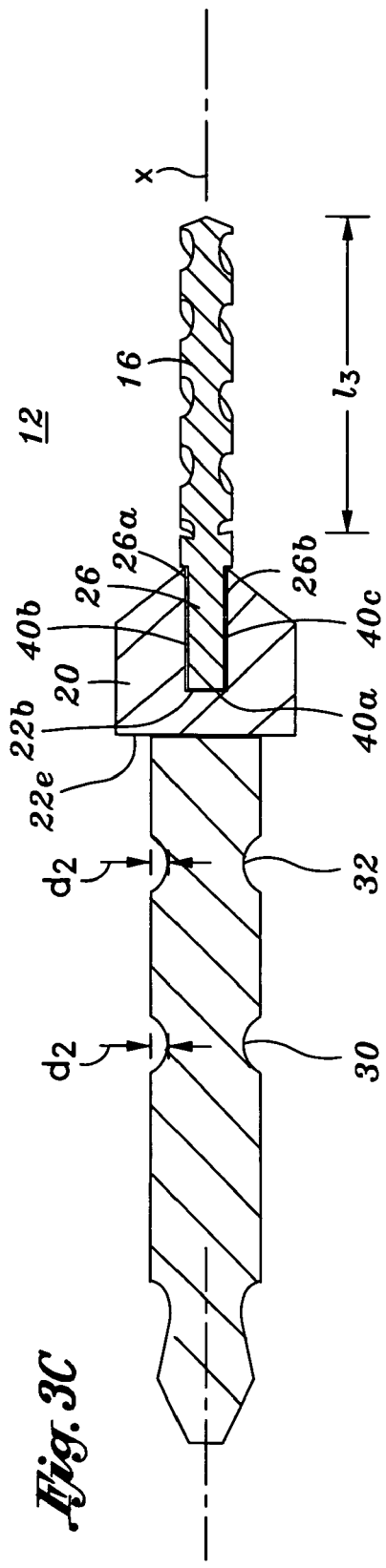

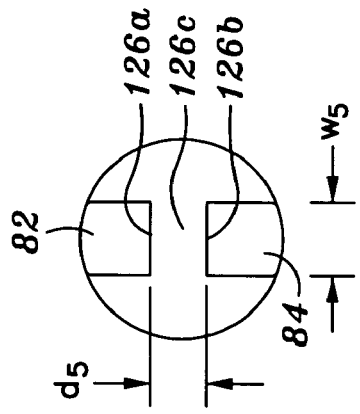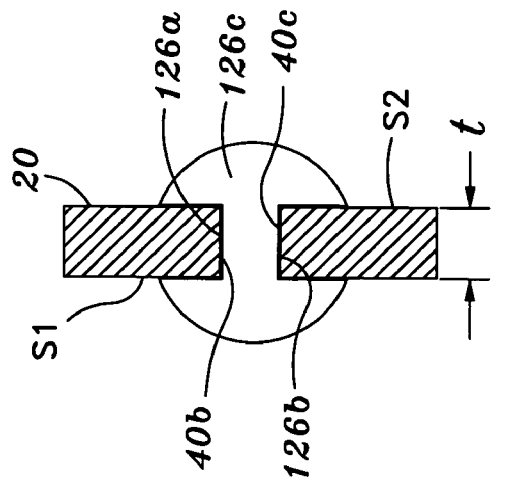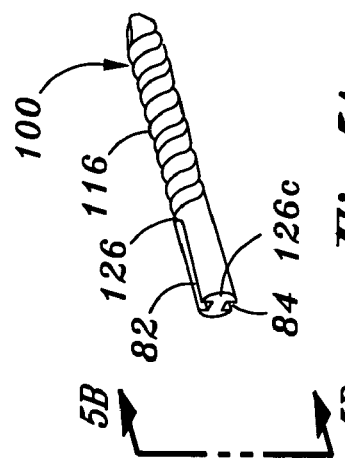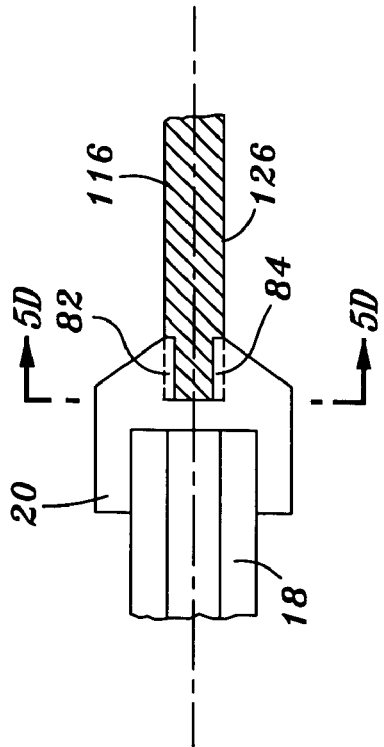

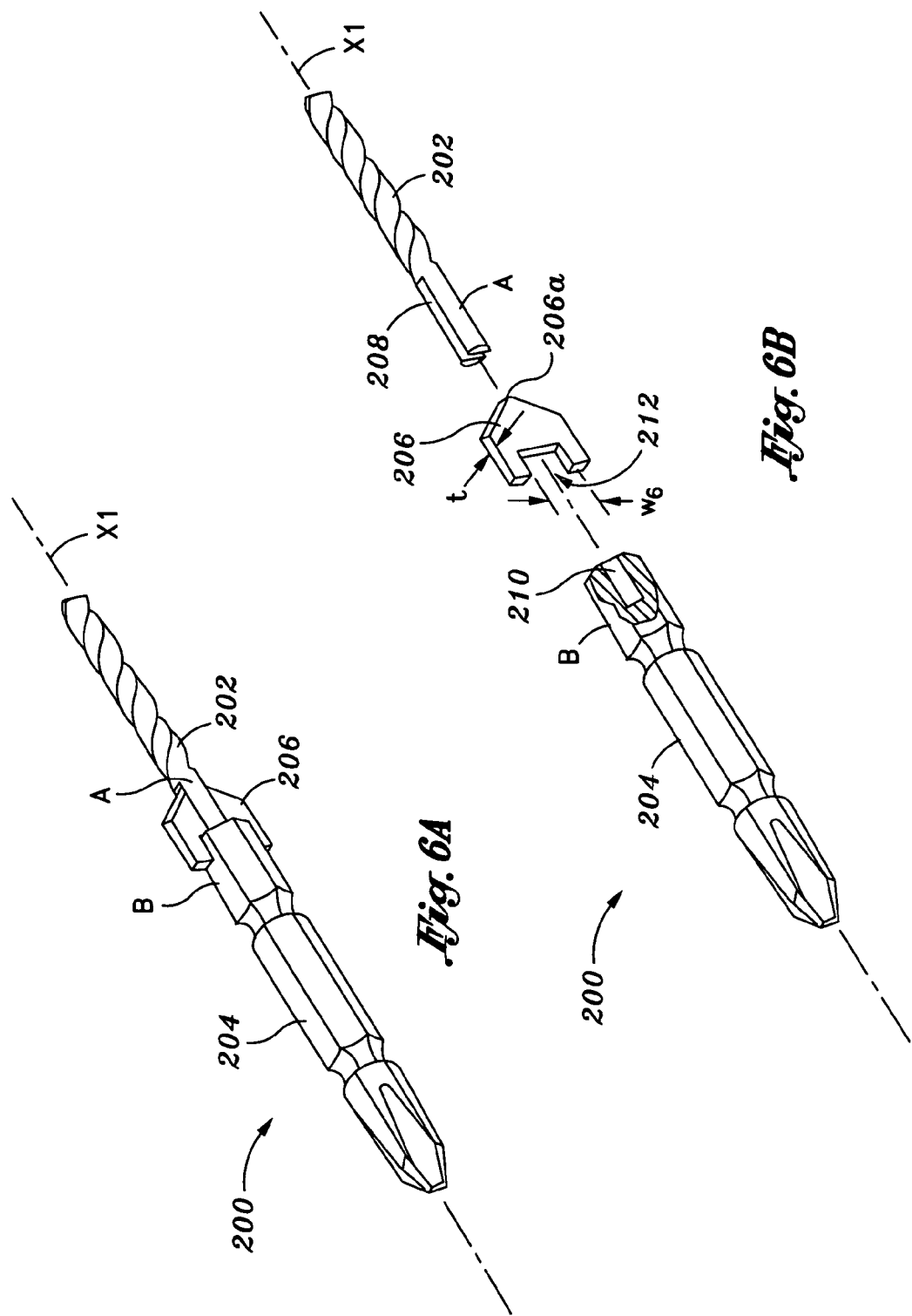

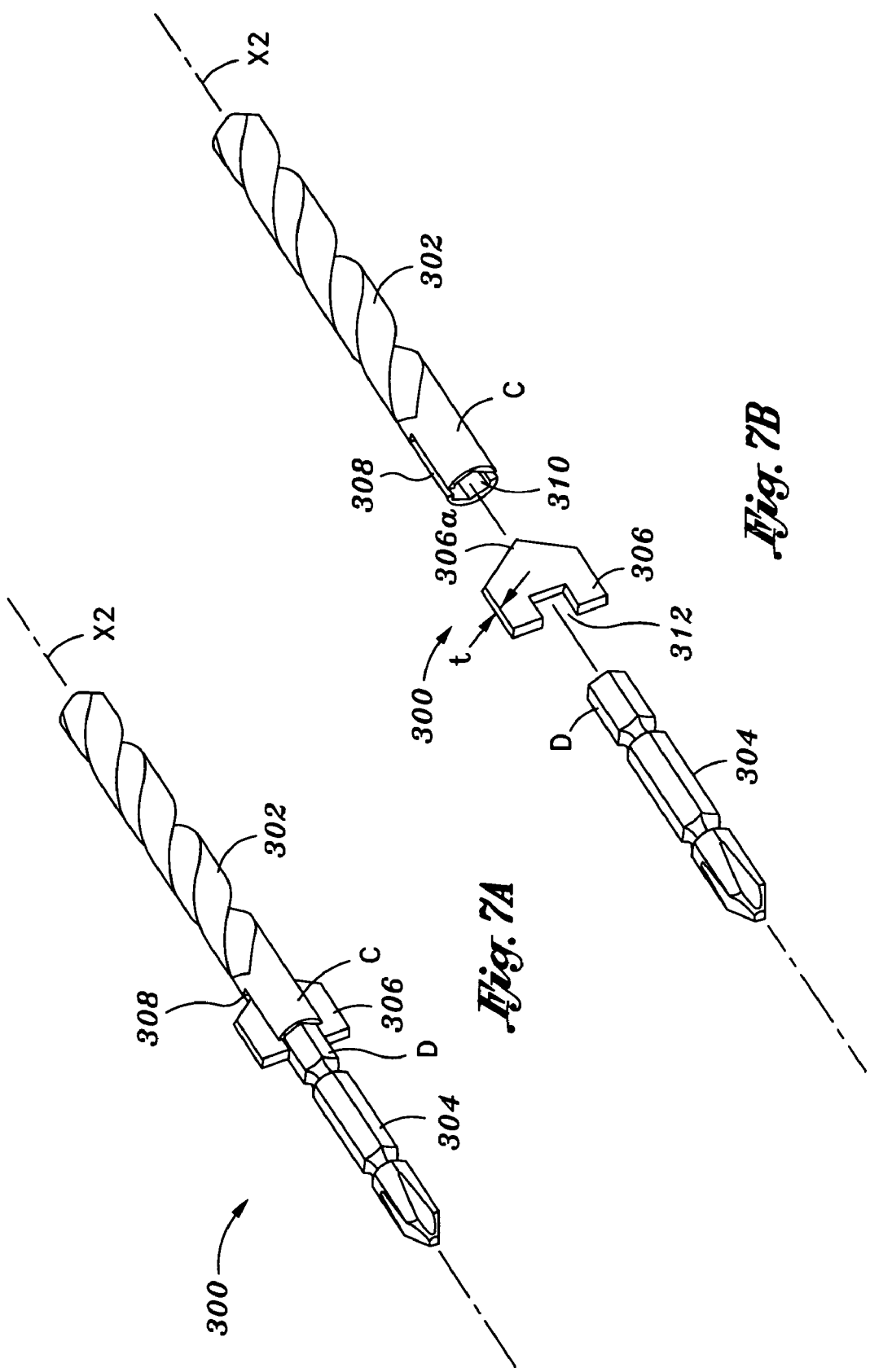

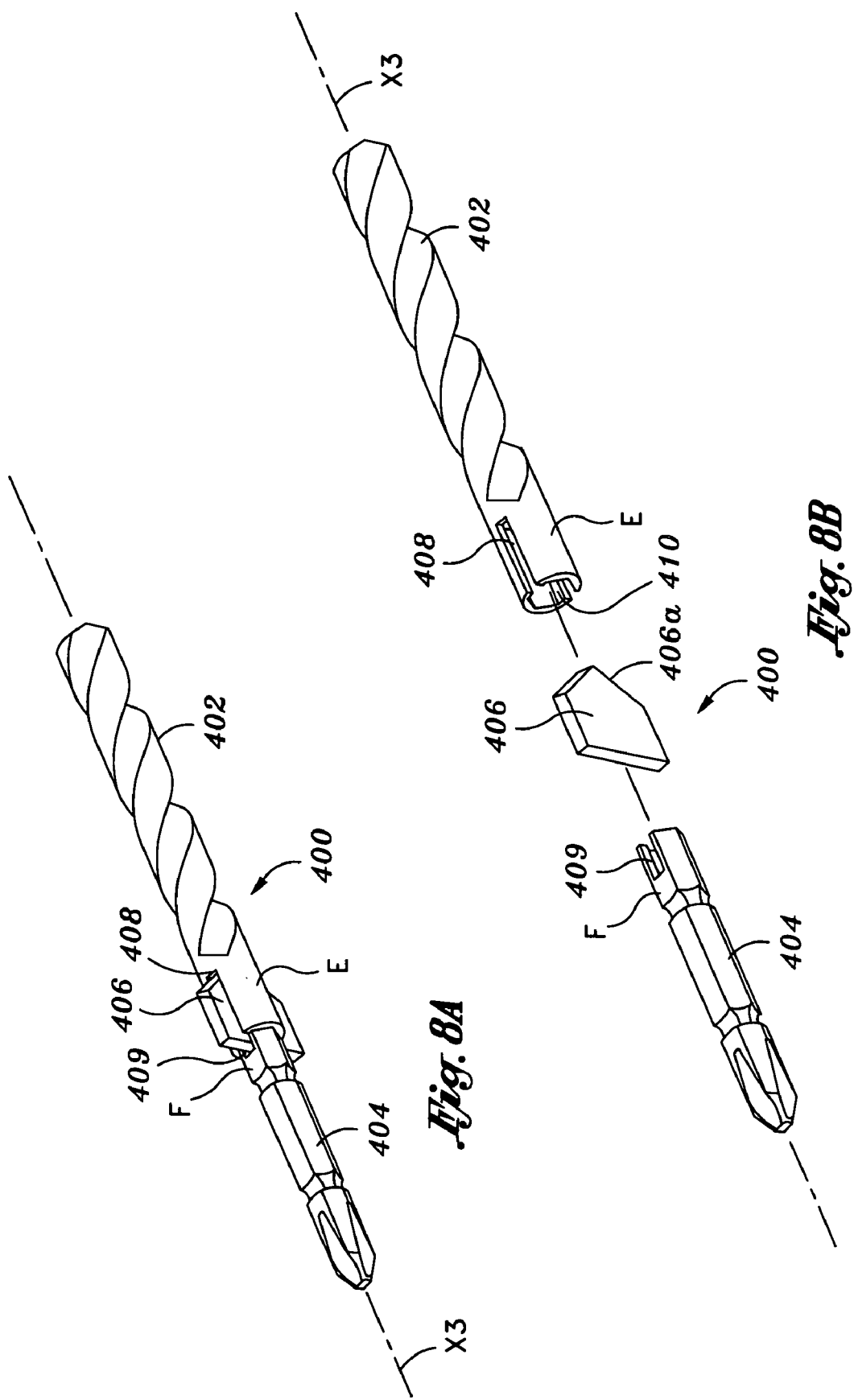

MULTI-FUNCTIONAL BIT & CONNECT-DISCONNECT COUPLING USED THEREWITH

INCORPORATION BY REFERENCE

The inventors incorporate herein by reference any and all U.S. patents, U.S. patent applications, and other documents cited or referred to in this application or cited or referred to in the U.S. patents and U.S. patent applications incorporated herein by reference.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

A drill bit is commonly used to drill a hole so that a screw may then be screwed into the hole using either a screwdriver or a screwdriver bit inserted into a power drill. It is often desirable to form a countersink around the hole so that the screw head will lie flush with, or below the drilled surface. With power drills, a connect-disconnect coupling, commonly referred to as a chuck, is frequently used to hold the drill bit. The connect-disconnect coupling is attached to the power drill in a manner that enables it to be detached when desired. U.S. Pat. No. 6,325,393 B1 is illustrative of such a connect-disconnect coupling.

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. The benefits of this invention include, but are not limited to: a low cost, easy to manufacture multi-functional bit and a connect-disconnect coupling specifically designed to accept and use the bit of this invention, which is (a) conveniently interactive with the connect-disconnect coupling of this invention, (b) enables a user to drill a hole with a countersink, and (c) enables a user to drive a fastener into the drilled hole.

Without limiting the scope of this invention as expressed by the claims that follow, some, but not necessarily all, of its features are:

One, the bit of this invention may comprise three separate, discrete components: a plate member including a cutting end, a driver element, and a drill element, with the driver element and drill element axially aligned. The plate member, driver element, and drill element, typically metallic components, may be assembled together with the plate member disposed intermediate the driver element and the drill element and its cutting end adjacent to the drill element. The driver element includes a driver head having a variety of different shapes depending on the type of fastener it is designed to interact with. The three components are fixedly connected together. Thus they remain in a fixed position relative to each other so that they do not separate or move relative to each other during use. For example, they may be press fitted together. Alternately, or in addition to, they may be bonded to each other by welding or gluing with a suitable metal adhesive, or they may be pinned together.

Two, the cutting end of the plate member serves to cut into an upper edge of a drilled hole a countersink concurrently when drilling the hole. This cutting end may be tapered. The plate member may have a pentagonal configuration with adjacent edges forming an apex providing a tapered cutting end. This apex merges with the drill element when the plate member is connected therewith. The plate member may have a uniform, predetermined thickness. A non-cutting end of the plate member opposed to the cutting end may have a cut-a-way section that receives the drill element.

Three, one element, or both of the drill and driver elements, may have an elongated axial groove therein. The plate member fits snugly within the groove. When both elements each have an elongated axial groove therein, the plate member has portions fitting snugly within each groove. Moreover, one of the elements may have at one end an axial cavity therein and the other element has an end that fits snugly within this cavity. The driver element may have a diameter that is greater than a diameter of drill element. In such case, the driver element has in one end the cavity into which the drill element fits snugly. The drill element may have a diameter that is greater than a diameter of driver element. In such case, the drill element has in one end the cavity into which the driver element fits snugly.

Four, in one embodiment, the slot in the plate member may have at least one edge and a first end portion of the drill element may have at least one sunken guideway therein which receives this edge of the slot. Typically, in this one embodiment, the slot has a pair of opposed edges and the first end portion of the drill element has a pair of opposed sunken guideways that receives these opposed edges. The plate member slides along these guideways as this first end portion of the drill element is being inserted into the cavity in the driver element. The sunken guideways may have a width that is slightly less than the thickness of the plate member, so that a press fit is achieved upon connection.

Five, the plate member and drill and drive elements may each have a locking section enabling these three components upon assembly together to interlock. These locking sections may be in the form of the grooves, slots, cut-a-way sections, guideways, and cavities. In one embodiment, the locking section, or sections, of each separate component has predetermined dimensions that enable the components to be press fitted together upon assembly, forming a frictional bond holding these components in the fixed position relative to each other. In such a case, an auxiliary bonding mechanism may be used in addition to the frictional bond holding these components in the fixed position relative to each other.

Six, in one embodiment, the driver element includes an elongated body having a longitudinal axis and a predetermined diameter. In this one embodiment, there is a cavity at an end of the driver element body. This cavity may be axially aligned with the longitudinal axis of the driver element body and is open at the end of the driver element body. This cavity typically has a predetermined diameter smaller than the diameter of the driver element body. A groove of predetermined width in the second end of the driver element body may intersect this cavity. Optionally, there is a pair of annular channels between the first and second ends of the body of the driver element that are used with certain types of connect-disconnect couplings, including the connect-disconnect couplings of this invention.

Seven, in one embodiment, the plate member may have in its non-cutting end a longitudinal slot that receives an end portion of the body of the drill element upon connecting the plate member and drill element. Upon assembly, the slot may be axially aligned along the longitudinal axis of the body of the driver element. Thus, upon connecting the plate member and driver and drill elements together, the end portion of the drill element extends through the slot and into the cavity in the driver element and the non-cutting end of the plate member is inserted into the groove in the driver element intersecting the cavity in the end of this driver element. The slot in the plate member may have a predetermined width that is slightly less than the diameter of the end portion of the drill element body, and the groove intersecting the cavity in the end of this driver element may have a predetermined thickness slightly less than the thickness of the plate member. Thus, a press fit is achieved upon sliding the first end portion of the drill element into the slot and sliding the plate member into the groove intersecting the cavity in the end of this driver element.

Eight, in one embodiment, the drill element includes an elongated body having an end portion with a diameter typically slightly larger than the diameter of the cavity in the driver element. The driver element and drill element are substantially axially aligned and the end portion of the drill element is at least partially inserted into the cavity, typically by press fitting to force this end portion into the cavity. Another end portion of the drill element includes a drill segment for drilling a hole in an object.

Nine, this invention also includes the connect-disconnect coupling that detachably holds the bit. When a drilled hole is to be made in an object, the driver element is inserted into an open mouth in the connect-disconnect coupling including a slot that has a predetermined size and configuration that receives the plate member. The drill element extends outward from the coupling and is used to drill a hole with the plate member concurrently forming a countersink. When a fastener and the like is to be driven into the drilled hole, the bit is removed from the coupling and the drill element is inserted into the coupling with the plate member again being received within the slot in the coupling. The driver element now extends outward from the coupling and is used to drive the fastener into the drilled hole with the countersink.

These features are not listed in any rank order nor is this list intended to be exhaustive.

DESCRIPTION OF DRAWING

Some embodiments of this invention, illustrating all its features, will now be discussed in detail. These embodiments depict the novel and non-obvious bit and coupling of this invention as shown in the accompanying drawing, which is for illustrative purposes only. This drawing includes the following figures (Figs.), with like numerals indicating like parts:

FIG. 1 is a perspective view, with sections broken away, of one embodiment of the bit and connect-disconnect coupling of this invention, showing the drill element of the bit almost completely inserted into the coupling.

FIG. 1A is a perspective view, with sections broken away, of the bit and coupling depicted in FIG. 1, showing the driver element of the bit almost completely inserted into the coupling.

FIG. 2 is a perspective view similar to that depicted in FIG. 1, showing the drill element of the bit partially inserted into the coupling.

FIG. 2A is a perspective view of this invention showing the driver element aligned to be inserted into the coupling.

FIG. 3B is a side view of the multi-functional bit shown in FIG. 3A showing its components assembled together.

FIG. 3C is cross-sectional view of the multi-functional bit taken along line 3C—3C of FIG. 3B.

FIG. 5A is perspective view of a drill element used in an alternate embodiment of the bit of this invention shown in FIG. 5C.

FIG. 5B is an end view of the drill element shown in FIG. 5A taken along line 5B—5B of FIG. 5A.

FIG. 5C is a fragmentary side view, partially in cross-section, of the alternate embodiment of the bit of this invention employing the drill element shown in FIG. 5A.

FIG. 5D is cross-sectional view taken along line 5D—5D of FIG. 5C.

FIG. 6A is a perspective view of another embodiment of the bit of this invention, showing a groove in the drill element that receives the plate member.

FIG. 6B is an exploded perspective view of the bit of this invention shown in FIG. 6A.

FIG. 7A is a perspective view of still another embodiment of the bit of this invention, showing a cavity in an end of the drill element that receives an end of the driver element.

FIG. 7B is an exploded perspective view of the bit of this invention shown in FIG. 7A.

FIG. 8A is a perspective view of still another embodiment of the bit of this invention, showing grooves in the ends of the driver and drill elements that each receive a portion of the plate member.

FIG. 8B is an exploded perspective view of the bit of this invention shown in FIG. 8A.

DETAILED DESCRIPTION OF SOME EMBODIMENTS OF THIS INVENTION

Figure 3:
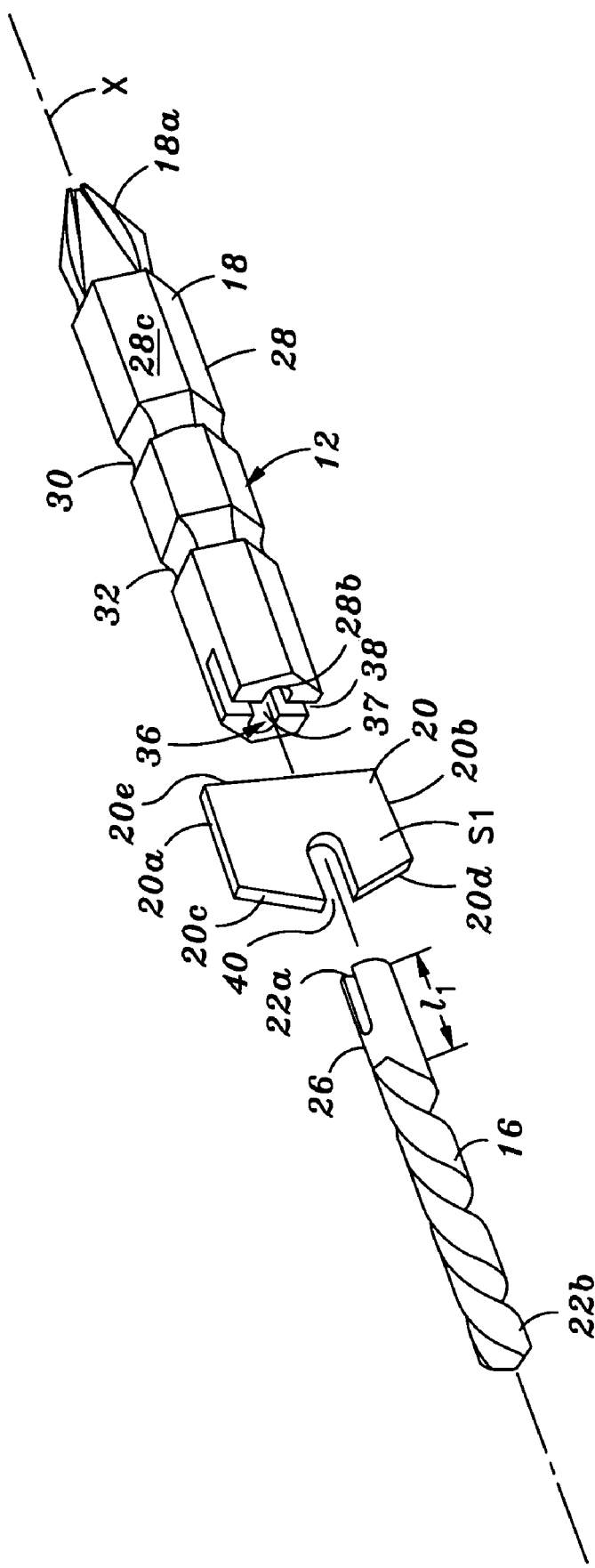
FIG. 3 is an exploded perspective view of the multi-functional bit of this invention shown in FIG. 1.
Figure 4:
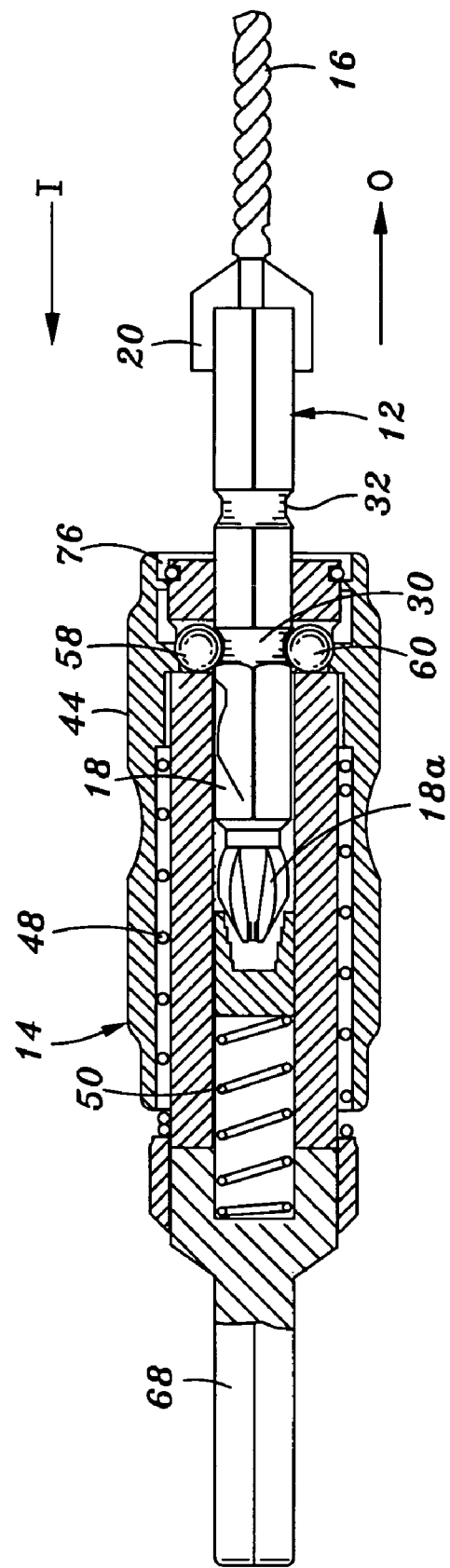
FIG. 4 is a side view of the bit partially inserted into the connect-disconnect coupling of this invention shown in cross-section.

FIGS. 1, 1A, 2 and 2A depict on embodiment of the multi-functional bit of this invention, namely, the bit 12, being inserted into one embodiment of the connect-disconnect coupling of this invention, namely, the coupling 14 (FIG. 4). As best depicted in FIG. 3, the bit 12 has at one end a drill element 16 and at its other end a screwdriver element 18. Between these elements 16 and 18 is a plate member 20 that provides means for forming a countersink at the mouth of a drilled hole. All these three separate and discrete components 16, 18, and 20 are made of metal selected for its properties for the intended application. Typically, various grades of steel are employed.

As shown in FIG. 1A, the connect-disconnect coupling 14 may be connected to a power drill (not shown) with the drill element 16 extending outward, enabling a user to drill a hole using the drill element 16, with the plate member 20 concurrently forming a countersink at the mouth of the drilled hole. As shown in FIG. 1, to drive a screw, or other type of fastener and the like, into the drilled hole, the bit 12 is detached from the connect-disconnect coupling 14, inverted, and reinserted into the connect-disconnect coupling with the screwdriver element 18 extending outward from the drill.

Figure 3A:
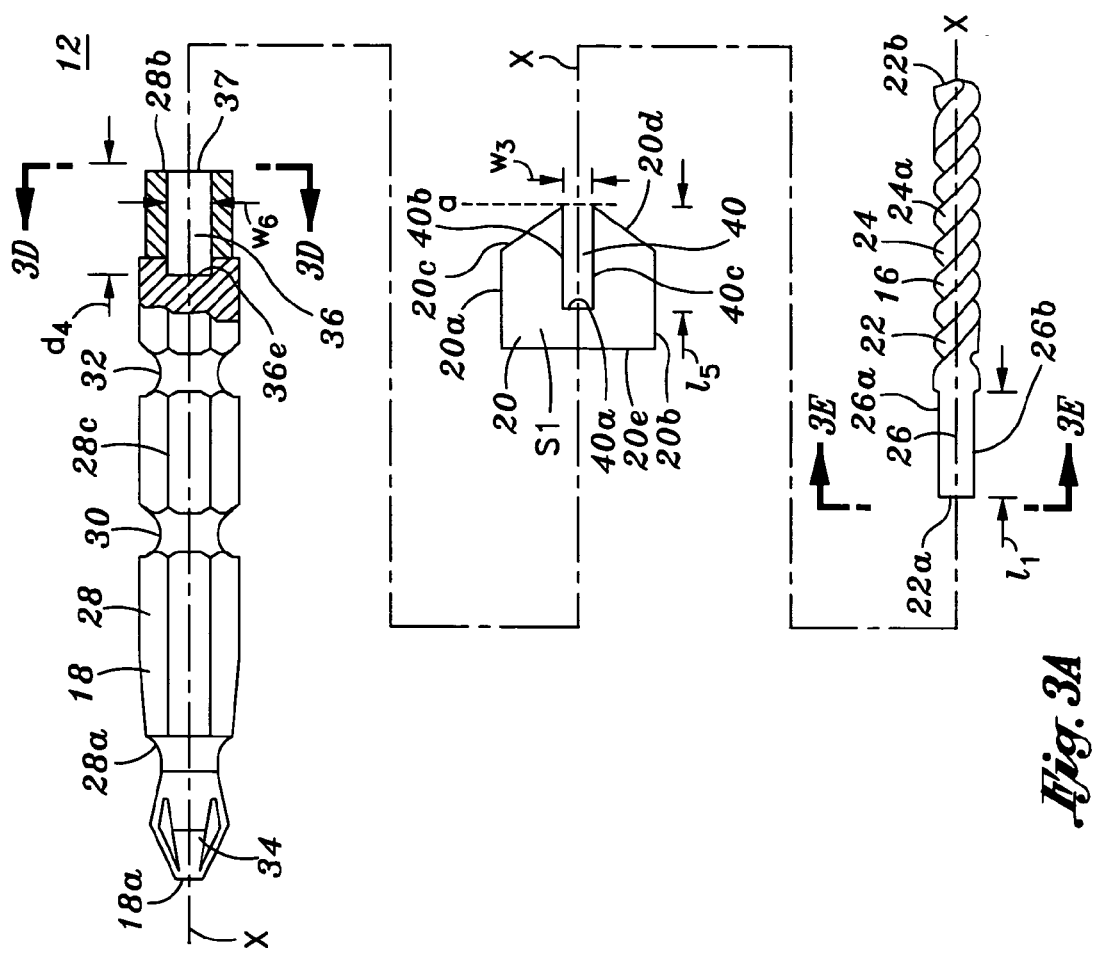
FIG. 3A is an exploded side view, with an inner end section of the driver element broken away, of the multi-functional bit of this invention shown in FIG. 1.

As best depicted in FIGS. 3 and 3A, the multi-functional bit 12 has a longitudinal central axis X that extends from the outer end 18a of the screwdriver element 18 to an outer end 22b of the drill element 16. The central axes of the drill element 16, the screwdriver element 18, and the plate member 20 may be each coincident with the central axis X of the bit 12. The screwdriver element 18 includes an elongated body 28 having a hexagonal cross-section with a pair of annular channels 30, 32 in the body terminating at an outer end 28a in the form of a screwdriver head 34. While a Phillips-type screwdriver head is depicted, other driver heads such as a flat-head type, an Allen wrench, or a socket driver could be used. These, and other types of driver heads, come within the meaning of the term "driver element." The annular channels 30 and 32 are spaced apart along the outer surface 28c of the elongated body 28, and each may have a depth $d_2$ (FIG. 3C), where the depth $d_2$ may be about equal to the radius of ball bearings 58 and 60 (FIG. 4) that may be employed in connect-disconnect couplings 14 illustrated in Fig 4.

Figure 3D:
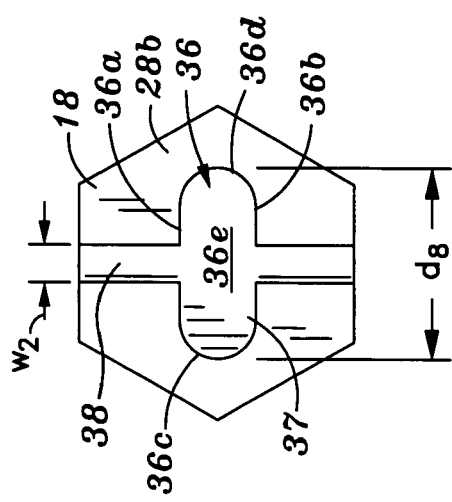
FIG. 3D is an end view of the screwdriver element taken along line 3D—3D of FIG. 3A.

In an inner end 28b of the body 28 of the driver element 18 is a cavity 36 formed by boring into the body along the central axis X. As best shown in FIG. 3D, this cavity 36 has an open mouth 37, located flush with the inner end 28b, that has a configuration that has essentially the same shape as an insert portion 26 (FIG. 3E) of the drill element 16. In the embodiment illustrated, both the open mouth 37 and the insert portion 26 have a substantially fattened oval shape with the major diameter $d_7$ of the insert portion 26 being slightly greater than the major diameter $d_8$ of the open mouth 37 of the cavity 36. Specifically, as depicted in FIG. 3D, the cavity 36 has a pair of opposed flat sidewalls 36a, 36b and a pair of opposed curved sidewalls 36c, 36d, and a floor 36e (FIG. 3B). This cavity 36 extends inward towards the outer end 18a of the screwdriver element 18 to a depth $d_4$ (FIG. 3B). The inserted portion 26 may have a length $l_1$ (FIGS. 3 and 3A) that is equal to or less than the depth $d_4$ of the cavity 36.

As shown in FIG. 3D, there is a groove 38 (FIG. 3D) intersecting central axis X and positioned crosswise to the cavity 36. This groove 38 has a substantially rectangular configuration, with a width $w_2$. It extends lengthwise into the body 28 and has a depth $d_1$ (FIG. 2A) that is may be equal to or greater than the depth $d_4$ of the cavity 36. The cavity's depth $d_4$ may be, however, less than the depth $d_1$ of the groove 38. The centers of the groove 38 and cavity 36 may each be coincident with the central axis X.

As shown best in FIG. 3A, the plate member 20 fits into the groove 38. The plate member 20 may have many different shapes. In the embodiment depicted, it is generally pentagonal in shape with opposed exterior, parallel sidewall portions S1 (FIG. 2) and S2 (FIG. 2A), so that the plate member 20 is of substantially uniform thickness t (FIG. 2A). The plate member 20 comprises a pair of opposed side edges 20a, 20b, a pair of tapered side edges 20c, 20d, a base side edge 20e, and an elongated, central slot 40. The tapered side edges 20c, 20d extend from the side edges 20a and 20b towards each other, at substantially the same angle and end at a common apex a (straight line shown in dotted lines FIG. 3A). The angle and length of the tapered side edges 20c, 20d may be sized to match the head of the screw to be driven, such that, when a countersink is formed, the screw lies flush with, or below, the surface of the drilled object.

The central axis X may divide the plate member 20 into two equally sized halves such that each half is a mirror image of the other. As best shown in FIG. 3A, the slot 40 has a base wall 40a and a pair of sidewalls 40b, 40c that extend in parallel from the base wall to the apex a. The slot 40 has a width $w_3$ and a length $l_5$. The width $w_3$ of the slot 40 and the thickness t of the plate 20 may be about equal, or the width $w_3$ may be slightly less than the thickness t so that a press fit may be achieved. The length $l_5$ may be about equal to the length $l_1$ (FIG. 3A) of the insert portion 26. The inserted portion 26 of the drill element 16 may have a length $l_1$ that is about equal to the length $l_5$ of the slot 40.

Figure 3E:
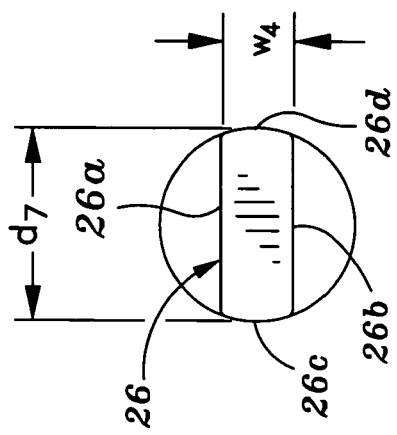
FIG. 3E is an end view of the drill element taken along line 3E—3E of FIG. 3A.

Referring to FIGS. 3A and 3E, the drill element 16 comprises a generally cylindrical body 22 having an inner end 22a, an outer end 22b, drilling portion 24 and the insert portion 26. The drilling portion 24 has a spiraling flute 24a that extends from the outer end 22b to the insert portion 26. The length $l_3$ (FIG. 3C) of the drilling portion 24 is typically sized to be equal to or greater than the length of the screw to be driven. The insert portion 26 extends from the inner end 22a to the drilling portion 24 and has a flatten oval, cross-sectional shape comprising a pair of opposed, flat sidewalls 26a, 26b (FIG. 3E), and a pair of opposed curved sidewalls 26c, 26d. This flatten oval cross-sectional shape of the insert portion 26 is substantially the same as the cross-sectional shape of the cavity 36, but with slightly greater dimensions so that a press fit may be achieved. The width $w_4$ of the insert portion 26 (the distance between the opposed flat sidewalls 26a and 26b) and the width $w_3$ of the slot 40 of the plate member 20 may be about equal, or the width $w_3$ may be slightly less than the width $w_4$ so that a press fit may be achieved.

The drill element 16 is connected to the plate member 20 by inserting the inner end 22a of the drill element into the slot 40 of the plate member 20. Referring to FIG. 3C, as the insert portion 26 advances into the slot 40 in the plate member 20, the flat sidewalls 26a, 26b of the inserted portion contact and are, respectively, pressed against the sidewalls 40b, 40c of the slot until the inner end 22a of the drill element 16 abuts the base wall 40a of the slot. The assembled drill element 16 and plate member 20 may then be inserted into the cavity 36 with the plate member being press fitted into the groove 38 in the screwdriver element 18. The curved sidewalls 26c and 26d of the insert portion 26 now contact and are, respectively, pressed against the curved sidewalls 36c and 36d of the cavity 36 in the driver element 18. The plate member 20 may be inserted along a portion or the entire depth $d_4$ of the groove 38, filling this groove. The driver element 18, the drill element 16, and plate member 20 are now frictionally bonded together.

As discussed above, the dimensions of the cavity 36, groove 38, slot 40, plate 20, and insert portion 26 are carefully controlled so that these components are interlocked together by a press fit. Although the drill element 16, plate member 20, and screwdriver element 18 may be coupled together solely by press fitting, it may be desirable to reinforce or otherwise supplement the frictional bond between these three separate components. For example, to insure against disconnection, these separate components may be welded, glued with a metal adhesive, or pinned by drilling an aperture (not shown) through the assembled driver element 18, the drill element 16, and plate member 20 and forcing a pin (not shown) into this aperture.

FIGS. 5A through 5D illustrate an alternate embodiment of the bit of this invention, namely, the bit 100. This bit 100 is similar to the bit 12 and includes the screwdriver element 18 connected to the plate member 20 as discussed above and a drill element 116 having an inserted portion 126 including a pair of sunken guideways 82 and 84. These sunken guideways 82 and 84 are aligned and each have a flat bottom wall 126a and 126b, respectively. These bottom walls 126a and 126b are spaced apart by the distance $d_5$ that is equal to the width $w_3$ of the slot 40 in the plate member 20. The sunken guideways 82, 84 have a width $w_5$ slightly less than the thickness t of the plate member 20. Upon press fitting the plate member 20 and the inserted portion 126 together, the inserted portion 126 extends into the slot 40 in the plate member 20 with the sidewall 40b of the plate member 20 bearing against the bottom wall 126a, the sidewall 40c of the plate member 20 bearing against the bottom wall 126b, and the end 126c of the inserted portion 126 abutting the base wall 20e of the plate member 20. A press fit is achieved, with the sides of the sunken guideways 82, 84 pressing against the opposed exterior sidewall portions S1 and S2 of the plate member 20 adjacent the slot 40 to laterally support the plate member. As discussed above, it may be desirable to reinforce or otherwise supplement the frictional bond between these three separate components.

FIGS. 6A and 6B illustrate another embodiment of the bit of this invention, namely, the bit 200. The bit 200 includes three components: a drill element 202, a driver element 204, and a plate member 206 disposed between the adjacent ends A and B, respectively of the drill element and driver element. There is a cylindrical cavity 210 in the end B of the driver element 204 into which the cylindrical end A of the drill element 202 fits snugly. The plate member 206, being substantially pentagonal in shape, has four of the five sides of a pentagon, but the fifth side has therein a substantially U-shaped cut-a-way section 212 with a width $w_6$ that is about equal to the diameter of the end B of the driver element 204. In the end A of the drill element 202 there is an elongated axial groove 208 extending inward along the bit's longitudinal axis X1. This groove 208 has a width that is substantially equal to the thickness t of the plate member 206. Upon assembly of the three components, a cutting end 206a of the plate 206 is received in the groove 208 and the end B of the driver element 204 fits snugly into this cut-a-way section 212. These components may be force fitted together or an auxiliary bonding mechanism in addition to the frictional bond may be used to hold these components in a fixed position relative to each other.

FIGS. 7A and 7B illustrate another embodiment of the bit of this invention, namely, the bit 300. The bit 300 includes three components: a drill element 302, a driver element 304, and a plate member 306 disposed between the adjacent ends C and D, respectively of the drill element and driver element. There is a cavity 310 in the end C of the drill element 302 having a hexagonal configuration substantially of the same dimensions as the cross-sectional shape of the end D of the driver element 304. The plate member 306 is substantially of the same shape as the plate member 206 and includes a substantially U-shaped cut-a-way section 312 that is about equal to the diameter of the end D of the driver element 304. In the end C there is an elongated axial groove 308 therein extending inward along the longitudinal axis X2 having a width that is substantially equal to the thickness t of the plate member 306. Upon assembly of the three components, a cutting end 306a of the plate 306 is received in the groove 308 and the end D of the driver element 304 fits snugly into the cut-a-way section 312 and also into the cavity 310. These components may be force fitted together or an auxiliary bonding mechanism may be employed such as discussed above.

FIGS. 8A and 8B illustrate another embodiment of the bit of this invention, namely, the bit 400. The bit 400 includes three components: a drill element 402, a driver element 404, and a plate member 406 disposed between the adjacent ends E and F, respectively of the drill element and driver element. There is a cavity 410 in the end E of the drill element 402 having a hexagonal configuration substantially of the same dimensions as the cross-sectional shape of the end F of the driver element 404. The plate member 406 has a pentagonal shape with a cutting end 406a. In the end E is an elongated axial groove 408 therein extending inward along the longitudinal axis X3 having a width that is substantially equal to the thickness t of the plate member 406. In the end F is an elongated axial groove 409 therein extending inward along the longitudinal axis X3 having a width that is substantially equal to the thickness t of the plate member 406. Upon assembly of the three components, the cutting end portion 406a of the plate 406 is received in the groove 408 in the drill element 402 and a non-cutting end portion 406 end of the plate 406 is received in the groove 409 in the driver element 404. The plate 406 fits snugly in the grooves 408 and 409 and the driver element 304 fits snugly into the cavity 410. These components may be force fitted together or an auxiliary bonding mechanism may be employed such as discussed above.

Connect-Disconnect Coupling

The bits of this invention may be used with the connect-disconnect coupling of this invention. The use of the bit 12 with the embodiment of the connect-disconnect coupling of this invention, the coupling 14, is illustrative. The coupling 14 is connected to a drill (not shown) and the bit 12 inserted therein is first used to create a drilled hole and countersink, and then to drive a screw or other type of fastener and the like into the drilled hole. A user first connects the connect-disconnect coupling 14 to a drill (not shown) by inserting an arm 68 of the coupling into a clamping mechanism of the drill. Referring to FIGS. 1, 2 and 4, the user inserts the outer end 18a of the screwdriver element 18 of the bit 12 into the connect-disconnect coupling 14 by grasping a sleeve 44 of the coupling and moving it inward I into an unlocked position. As the bit 12 moves inward, the ball bearings 58 and 60 interact with the annular channels 30 and 32 in the screwdriver element 18. When the bit 12 is properly positioned in the coupling 14, portions of the ball bearings 58 and 60 extend into in the annular channel 32 in the screwdriver element 18. The user then releases his or her grasp of the sleeve 44 and a sleeve spring 48 moves the sleeve outwardly O into a locked position. The sleeve 44 now applies a radial inward force on the ball bearings 58 and 60 to lock the bit 12 in the connect-disconnect coupling 14 with the drill element 16 extending outward as shown in FIG. 1A.

Using the drill element 16 of the bit 12, the user then drills a hole in an object (not shown) to a depth so that tapered sides 20c, 20d of the plate member 20 can contact the object being drilled. As the drill element 16 rotates and advances, the tapered sides 20c, 20d form a countersink at the mouth of the hole being drilled in the object. Once the countersink is formed and the drill element 16 removed from the hole being drilled, the bit 12 is removed from the connect-disconnect coupling 14. The user removes the bit 12 by moving the sleeve 44 inwardly in the direction of the arrow I to the unlocked position. The user grasps the bit 12 and manually removes it from the connect-disconnect coupling 14. The user may grasp a portion of the plate member 20 to aid in holding the bit 12.

The user now reinserts the bit 12, inserting the drill element 16 and the plate member 20 into the connect-disconnect coupling 14. When inserted, the drill element 16 lies within the coupling 14 and the screwdriver element 18 extends outward from the coupling as shown in FIG. 1. The bit 12 is locked in position by releasing the grasp of the sleeve 44 with the sleeve spring 48 moving the sleeve outward O into the locked position. The ball bearings 58 and 60 now lie within annular channel 30. The user may then use the screwdriver element 18 to drive a screw etc. into the drilled hole. When the screw is completely driven in, the head of the screw may lie within the countersink such that the screw head is flush with, or below the surface of the object. To remove the bit, the sleeve 44 is again moved into the unlocked position. Upon moving from a locked to an unlocked position, a plunger spring 50 in the coupling that is compressed upon insertion of the bit 12 into the coupling 14, expands and ejects the bit 12 from the connect-disconnect coupling.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A bit comprising
a drill element,
a driver element, and
a plate member having a cutting end,
said plate member, driver element, and drill element being assembled together with the plate member being intermediate the driver element and the drill element and said cutting end being adjacent to the drill element,
said drill element having an elongated groove therein and the plate member fits snugly therein,
said plate member having at one end a pointed tip and at an opposed end a cut-a-way section, an end portion of said driver element being received in the cut-a-way section, and
wherein the driver element has a diameter that is greater than a diameter of drill element and there is a cavity in one end of the driver element into which the drill element fits snugly.

2. A bit comprising
a drill element,
a driver element, and
a plate member having a cutting end,
said plate member, driver element, and drill element being assembled together with the plate member being intermediate the driver element and the drill element and said cutting end being adjacent to the drill element,
said drill element having an elongated groove therein and the plate member fits snugly therein,
said plate member having at one end a pointed tip and at an opposed end a cut-a-way section, an end portion of said driver element being received in the cut-a-way section, and
wherein the drill element has a diameter that is greater than a diameter of driver element and there is a cavity in one end of the drill element into which the driver element fits snugly.

3. A bit comprising
a drill element,
a driver element, and
a plate member having cutting end,
said plate member, driver element, and drill element being assembled together with the plate member being intermediate the driver element and the drill element and said cutting end being adjacent to the drill element where an end of one of the elements has a cavity therein and the other element has an end that fits snugly within said cavity.

4. A bit comprising
a drill element,
a driver element, and
a plate member having cutting end,
said plate member, driver element, and drill element being assembled together with the plate member being intermediate the driver element and the drill element and said cutting end being adjacent to the drill element,
said plate member, driver element, and drill element being separate components which are axially aligned and fixedly connected together, and
one of said elements has an elongated axial groove therein and the plate member fits snugly therein, and
an end of one of the elements has a cavity therein and the other element has an end that fits snugly within said cavity.

5. A bit comprising
a driver element and drill element that are axially aligned,
a plate member intermediate said driver element and drill element, said plate member having a cutting edge for forming a countersink,
said driver element including an elongated body having at a first end a driver head and at a second end a cavity,
said drill element including an elongated body having a first end portion and a second end portion including a drill segment, said first end portion being inserted into the cavity in the driver element,
said plate member, driver element, and drill element being three separate components that are fixedly connected together.

6. The bit according to claim 5 where the plate member has a first end received in a groove in one of the elements.

7. The bit according to claim 6 where one of the elements has an end with a cavity therein and the other element fits snugly within said cavity.

8. The bit according to claim 5 including a pair of annular channels between said first and second ends of the body of the driver element.

9. A bit comprising
a driver element and drill element that are axially aligned,
a plate member intermediate said driver element and drill element, said plate member having a cutting edge for forming a countersink,
said drill element including an elongated body having at a first end portion a drill tip and at a second end portion a cavity, said driver element including an elongated body having a first end with a driver head and a second end inserted into the cavity in the drill element, said plate member, driver element, and drill element being three separate components that are fixedly connected together.

10. The bit according to claim 9 where the plate member has a first end received in a groove in one of the elements.

11. The bit according to claim 10 where one of the elements has an end with a cavity therein and the other element fits snugly within said cavity.

12. The bit according to claim 9 including a pair of annular channels between said first and second ends of the body of the driver element.

13. A bit comprising
   a driver element including
      an elongated body having a longitudinal axis,
      a driver head at a first end of the driver element body,
      a cavity at a second end of the driver element body that is axially aligned with the longitudinal axis of the driver element body and open at the second end of the driver element body, and
      a groove in the second end of the driver element body intersecting the cavity,
   a drill element including
      an elongated body,
      a first end portion, and
      a second end portion including a drill segment, and
   a plate member having
      a first end, and
      a second end that is tapered and has a longitudinal slot therein,
   said driver element, drill element, and slot in the plate member being axially aligned along the longitudinal axis of the driver element body, with the first end portion of the drill element being received in the slot in the plate member and being at least partially inserted into the cavity, and the first end of the plate member being at least partially inserted into the groove.

14. The bit according to claim 13 where the groove has a predetermined width and the plate member has a predetermined thickness slightly greater than said predetermined width of the groove.

15. The bit according to claim 13 where the slot has a predetermined width that is slightly less than the diameter of the first end portion of the drill element body.

16. The bit according to claim 13 where the slot has at least one edge and the first end portion of the drill element has at least one sunken guideway therein which receives the edge of the slot.

17. The bit according to claim 13 where the plate member has a pentagonal configuration.

18. The bit according to claim 13 where the second tapered end of the plate member merges with the drill element.

19. The bit according to claim 13 where the driver element, the drill element, and the plate member are press fitted together.

20. The bit according to claim 13 including a pair of annular channels between said first and second ends of the body of the driver element.

21. A bit comprising
   a driver element including
      an elongated body having a longitudinal axis and a predetermined diameter, a driver head at a first end of the driver element body, a cavity at a second end of the driver element body axially aligned with the longitudinal axis of the driver element body and open at the second end of the driver element body and having a predetermined diameter smaller than the diameter of the driver element body, and
      a groove in the second end of the driver element body intersecting the cavity and having a predetermined width,
   a drill element including
      an elongated body,
      a first end portion with a diameter slightly larger than said diameter of the cavity, and
      a second end portion including a drill segment, and
   a plate member having
      a first end,
      a second end that is tapered, and
      a predetermined width slightly larger than the predetermined width of the groove in the driver element body,
   said driver element and drill element being axially aligned, with the first end portion of the drill element being at least partially inserted into the cavity, and the first end of the plate member being at least partially inserted into the groove.

22. The bit according to claim 21 where the plate member has a pentagonal configuration.

23. The bit according to claim 21 where the second tapered end of the plate member has an apex merging with the drill element.

24. The bit according to claim 21 where the driver element, the drill element, and the plate member are press fitted together.

25. The bit according to claim 21 including a pair of annular channels between said first and second ends of the body of the driver element.

* * * * *